OR    3,966,299

United States    3,966,299
Osterfield et al.    June 29, 1976

[54] COMMUNICATION CABLES

[75] Inventors: John Richard Osterfield; Robert George Pragnell, both of Eastleigh, England

[73] Assignee: Pirelli General Cable Works Limited, London, England

[22] Filed: Mar. 19, 1975

[21] Appl. No.: 559,883

[30] Foreign Application Priority Data
Mar. 20, 1974    United Kingdom............... 12467/74

[52] U.S. Cl........................... 350/96 C; 350/96 WG
[51] Int. Cl.²............................................. G02B 5/16
[58] Field of Search ...................... 350/96 C, 96 WG

[56]    References Cited
UNITED STATES PATENTS
3,734,594    5/1973    Trambarulo............... 350/96 WG X
3,793,541    2/1974    Ashkin et al.............. 350/96 WG X
3,813,141    5/1974    Miller............................ 350/96 WG

*Primary Examiner*—John K. Corbin
*Assistant Examiner*—Stewart Levy
*Attorney, Agent, or Firm*—Brisebois & Kruger

[57]    ABSTRACT

A communications cable system comprises a plurality of cables joined end-to-end, each cable comprising a plurality of single-material optical fibers, and a plurality of joint accessories each joining the ends of an adjacent pair of cables. At the end of each cable is provided a plurality of short cladded-core optical fibers optically joined to the ends of respective single-material fibers. The other ends of the cladded-core fibers project and the projecting cladded-core fibers of the two joined cables are inserted into opposite ends of capillary tubes which are supported within the joint accessory. The cladded-core fibers of the joined cables abut end-to-end and are long enough to follow curved paths between the ends of the cables and the joint accessory through-bores, so as to be under axial compressive forces.

11 Claims, 3 Drawing Figures

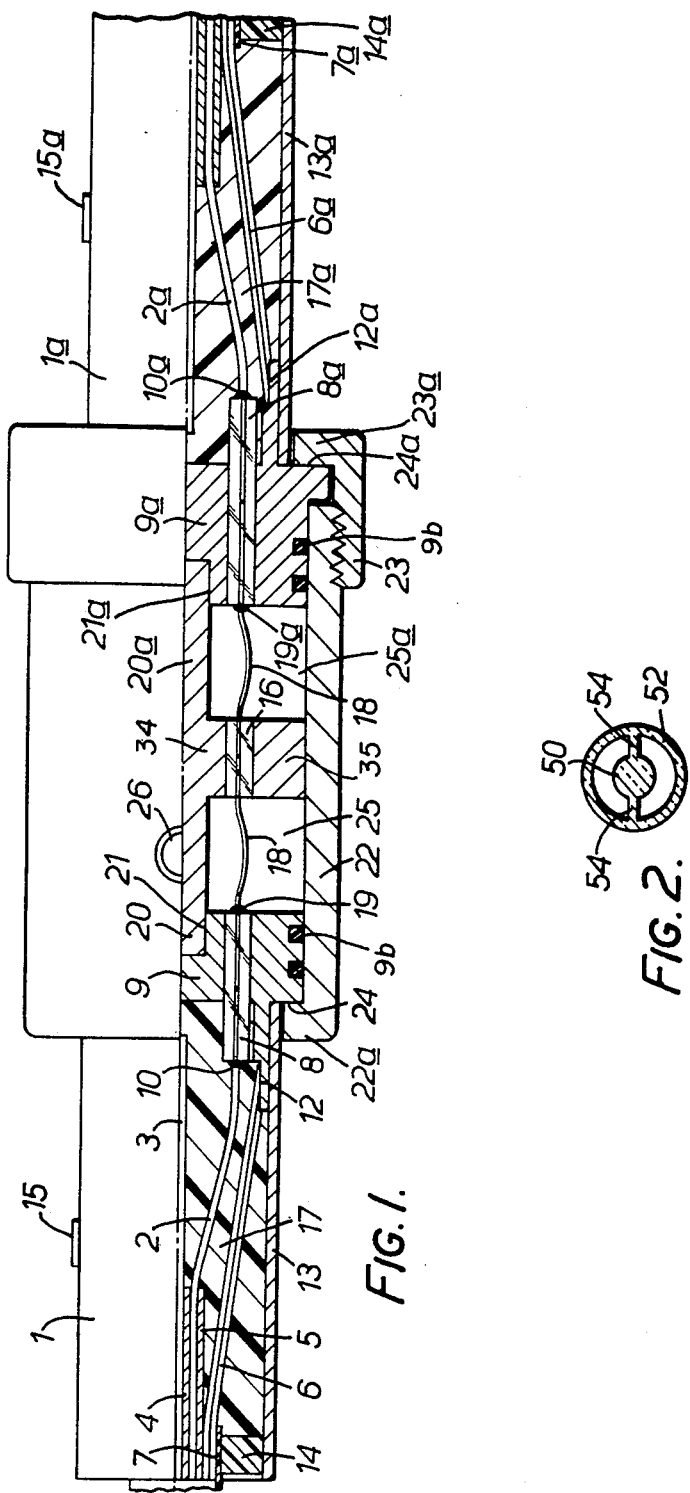

COMMUNICATION CABLES

This invention relates to a communications cable which comprises a plurality of single-material optical fibres.

As seen from one aspect, this invention provides a communications cable comprising a plurality of single-material optical fibres optically joined at their opposite ends to respective short lengths of cladded-core optical fibres, the opposite ends of said cladded-core optical fibres projecting for insertion into respective sockets of a joint or terminal accessory.

Preferably, the cable comprises, at each end thereof, a plurality of capillary tubes having longitudinal through-bores receiving in their opposite ends respective said single-material optical fibres and respective said cladded-core optical fibres, the single-material optical fibres abutting end-to-end the respective cladded-core optical fibres.

The joining of the short lengths of cladded-core optical fibres to the single-material optical fibres is a precision operation if sufficient optical transmission across these joints is to be achieved. For this reason the operation is performed in the factory, rather than as part of a jointing operation conducted in the field when laying the cable.

Two such cables may be joined end-to-end using a joint accessory comprising a plurality of capillary tubes having respective through-bores. The two cable ends to be joined are approached to opposite ends of the joint accessory and the projecting ends of the cladded-core optical fibres of the respective cable ends are inserted into the opposite ends of the capillary tubes of the joint accessory. Equally, one such cable may be joined to a terminal accessory comprising a plurality of cladded-core optical fibres inserted, at the ends thereof to be joined, into the bores of respective capillary tubes and extending for part of the length of those bores. The cable end is approached to the terminal accessory and the projecting cladded-core optical fibres of the cable end are inserted into the free ends of the terminal accessory capillary tubes.

Accordingly, as seen from a second aspect this invention provides a method of joining end-to-end two communications cables each as defined above as seen from said one aspect, said method comprising the steps of approaching the two cable ends to be joined to opposite ends of a jointing accessory, said accessory comprising a plurality of capillary tubes having respective through bores, and inserting the projecting ends of the cladded-core optical fibres of the respective cable ends into the opposite ends of the capillary tubes of the accessory so that the respective cladded-core optical fibres abut end-to-end.

Also, as seen from a third aspect this invention provides a method of joining to a terminal accessory an end of a communications cable as defined above as seen from said one aspect, said method comprising a plurality of cladded-core optical fibres inserted, at the ends thereof to be joined to the cable, into the bores of respective capillary tubes and extending for part of the length of said bores, said method comprising the steps of approaching together said cable end and said terminal accessory and inserting the projecting cladded-core optical fibres of said cable end into the free ends of the capillary tubes of said accessory so that the respective cladded-core optical fibres abut end-to-end.

Accordingly a complete cable system may be laid, comprising several lengths of cable with joint accessories and terminal accessories, with the cores of the individual optical fibres in optical continuity from one end of the system to the other.

Preferably the jointing of two cables or of one cable to a terminal accessory is carried out so that the projecting optical fibre ends of the or each cable are longer than to reach and abut the cladded-core optical fibre ends of the terminal accessory or of the other cable, whereby the projecting optical fibres follow curved paths between the or each cable and the terminal or joint accessory capillary tubes and are under axial compressive forces. Preferably also, the jointing method comprises the step of enclosing the jointed cables or jointed cable and terminal accessory over the jointing zone, including the formation of a chamber filled with liquid under pressure through which the projecting optical fibres extend from the capillary tubes of the respective cable to the capillary tubes of the joint or terminal accessory, said liquid having a refractive index matched to that of the core of the solid-core optical fibres. This liquid permeates down the capillary tube bores of the joint or terminal accessory to the interface between the two cladded-core optical fibres abutting therein, and completes the optical continuity between these two optical fibres.

An embodiment of the invention will now be described, by way of example only, with reference to the accompanying drawings, in which FIG. 1 is a side elevation, partly in section, of a joint between two communication cables each comprising a plurality of single-material optical fibres;

FIG. 2 is a cross-section through a typical single-material optical fibre; and

Figure 3:
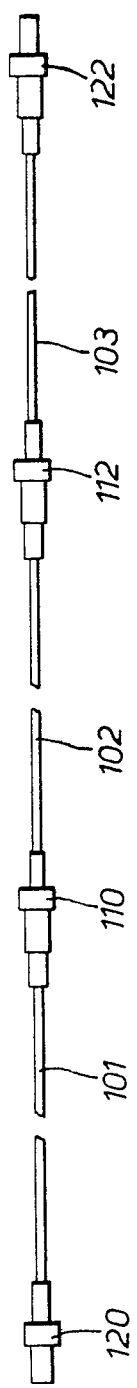
FIG. 3 shows a communications cable system.

Referring to FIG. 1 of the drawings there is shown a joint between two communications cables 1, 1a each comprising a plurality of single-material optical fibres. Only one such optical fibre is shown for each cable, namely optical fibres 2, 2a. A cross-section of a typical single-material (usually glass) optical fibre is shown on an enlarged scale in FIG. 2, the fibre being a one-piece construction having a cylindrical core 50 within a tubular sheath 52. An annulus of air separates the core 50 and sheath 52 but the core is supported relative to the sheath by longitudinally extending webs 54, 54. The core may be of any cross-sectional shape and connected to the sheath by any arrangement of supporting webs, providing the core is surrounded by an air space to provide a medium of lower refractive index than the core, and provided the webs are sufficiently narrow not to cause substantial attenuation of the optical signal transmitted by the core.

In the embodiment shown, each cable is as described in our British patent application No. 12468/74 (U.S. patent application Ser. No. 558,808). Thus, each cable comprises (as shown for cable 1) a central elongate member 3, preferably a cord comprising glass fibres stranded together, of high tensile strength relative to the single-material optical fibres. The single-material optical fibres are laid up helically around a cushioning layer 4 which is provided on the elongate member 3, preferably with the hand of the helical lay reversing periodically along the length of the cable. A tubular moisture barrier layer 5 encloses the single-material optical fibres and as described in our patent application 12468/74 this layer comprises a strip of plastics-metal foil laminate wrapped into tubular form with the metal foil facing inwards and with its opposite edges extending parallel to the axis of the cable and overlapping. The moisture barrier layer 5 further comprises a layer of cellular plastics, for example polyethylene, extruded over the metal strip under such conditions as to become integrally bonded to the plastics face of the laminate. The cellular polyethylene layer provides an outer cushioning layer which is resiliently deformable to cushion the single-material optical fibres against cross-sectional distortion during manufacture and laying of the cable, and cushioning layer 4 performs the same function. The cables 1, 1a also comprise double armouring layers 6, 6a, each comprising helically laid wires, and an outer plastics sheath 7, 7a. The single-material optical fibres are provided with individual plastics sleeves (not shown).

At the ends which are shown of cable 1, 1a, the single-material optical fibres are optically joined to respective short lengths of cladded-core optical fibres, for example the short lengths 18, 18a for single-material optical fibres 2, 2a. These lengths of cladded-core optical fibres comprise glass cores cladded with a glass of a lower refractive index but the refractive index of the core is matched to that of the core of the single-material fibres. The ends of the cables 1, 1a comprise a plurality of glass or metal or plastics capillary tubes having longitudinal through-bores, for example capillary tubes 8, 8a. At one end, the capillary tubes 8, 8a receive the single-material optical fibres 2, 2a and at their opposite ends the capillary tubes receive the cladded-core optical fibres 18, 18a, the cladded-core optical fibres projecting for insertion into individual sockets as will be described below. In each capillary tube, for example tube 8, the single-material and cladded-core fibres abut together at approximately the mid-length of the capillary tube. In order to ensure good optical transmission across this joint, the ends of the abutting optical fibres are accurately flat and perpendicular to the lengths of the fibres and also the fibres are properly abutted together. The optical fibres are joined together by an adhesive, preferably a cyanoacrylate resin, of refractive index matched to the cores of the optical fibres. Seals 10, 19 and 10a, 19a, comprising deposits of resin, are applied to the opposite ends of the capillary tubes to secure the optical fibres to the capillary tubes and also to close the ends of the capillary tube bores to fluids. The single-material optical fibres are stripped of their plastics sleeves over the lengths thereof inserted into the capillary tubes.

The capillary tubes are supported, with their longitudinal axes parallel to the longitudinal axis of the cable, by circular metal end blocks 9, 9a, the capillary tubes being received in individual apertures formed through the end blocks 9, 9a.

The metal blocks 9, 9a are anchored to the expanded ends of the armouring layers of the cables by means of welding or brazing at 12, 12a. The metal blocks support respective ends of outer metal or plastics sleeves 13, 13a, the opposite ends of the sleeves 13, 13a being supported by annular elements 14, 14a formed from tape wrapped around the plastics sheaths of the cables 1, 1a. The spaces 17, 17a within the sleeves 13, 13a and behind the blocks 9, 9a are filled with resin through filling apertures 15, 15a provided in the sleeves. It will be noted that the layers 4, 5, and 6 of the cables are cut back from the end thereof to allow the single-material optical fibres to be expanded out to the diameter on which the capillary tubes 8, 8a are set and also that the armouring layers may be expanded out as shown. In an alternative arrangement, the blocks 9, 9a are moulded from plastics with the capillary tubes 8, 8a embedded therein, or otherwise with capillary bore directly moulded as part of the blocks: the armouring layers are then terminated by any suitable known means.

In the joint which is shown, a metal joint accessory 34 includes an annulus 35 supporting a plurality of glass or metal or plastics capillary tubes 16, of which only one is shown, arranged axially relative to the cables. The cladded core optical fibres 18, 18a of the cable 1, 1a are inserted into opposite ends of a respective capillary tube 16 of the accessory to meet approximately at the midpoint of the capillary tube 16. The optical fibres 18, 18a are longer than to reach and abut each other and therefore follow curved paths and experience axial compressive forces urging their adjacent ends into mutual abutment within tube 16. Appropriate spacing between the ends of the cables 1 and 1a is achieved through projecting stems 20, 20a on the annulus 35 engaging in bores 21, 21a in the metal blocks 9, 9a of the cables. The accessory 34 may be moulded from plastics with the capillary tubes 16 embedded therein or otherwise with capillary bores directly moulded as part of the accessory.

The joint is coupled and enclosed by two metal sleeves 22, 23. The metal sleeve 22 has an inwardly directed flange 22a at one end engaging a radially projecting shoulder 24 on the metal block 9. Metal sleeve 22 is screw-threaded over its outer surface at its opposite end and is threadedly engaged within one end of metal sleeve 23, which is formed at its opposite end with an inwardly directed flange 23a engaging a radially projecting shoulder 24a on metal block 9a. "O" rings 96 as shown seal the metal blocks to the sleeve 22. This latter sleeve encloses chambers 25, 25a on opposite sides of the annulus 35 and these chambers are filled with a liquid under pressure. This liquid has a refractive index matched to the optical fibres 18, 18a and this permeates to the junction between these fibres, to ensure an optically matched joint.

In constructing the joint shown in the drawings, the ends of the two cables are approached to opposite ends of the jointing accessory, engaging the stems 20, 20a with the bores 21, 21a. Next, the free ends of the optical fibres 18, 18a are inserted into the capillary tubes 16. Finally, the sleeves 22 and 23 are screwed together to lock the joint components together and to enclose the joint, and the chambers 25, 25a filled with the liquid under pressure through a plug 26.

The design of the joint which has been described permits the cables to be manufactured in standard lengths and to be mechanically coupled together in such a manner that subsequently a cable length could be uncoupled and removed and replaced by another.

The opposite end from that which is shown of cable 1 is identical with the end which is shown of cable 1a, and cable 1a is identical with cable 1.

In joining a cable end to a terminal accessory, the terminal accessory comprises a plurality of cladded-core optical fibres received in the ends of respective capillary tubes. The method corresponds with that employed when joining together two cables, the cable being approached to the terminal accessory and the projecting cladded-core fibres of the cable inserted into the capillary tubes of the terminal accessory to abut the optical fibres of that accessory. The projecting optical fibres of the cable will be arranged to follow curved paths, as in the case of the joint between two cables, and the cable end and terminal accessory will be enclosed over the jointing zone to enclose a chamber filled with liquid through which the projecting optical fibres extend.

It will be noted, both in the case of the joint between two cables and in the case of the joint between a cable and a terminal accessory, that the liquid from the chamber is prevented from reaching the hollow space within the single-material optical fibres of the two cables. Firstly, the cladded-core optical fibres 18, 18a are unable to carry the liquid internally thereof because they are solid, and secondly the seals 19, 19a prevent the liquid from passing up the bores of the capillary tubes 8, 8a over the outer surfaces of the solid-core optical fibres 18, 18a. The seals 10, 10a prevent the resin in spaces 17, 17a from passing to the junction between the single-material and cladded-core optical fibres.

Referring to FIG. 3 of the drawings there is shown a communications system comprising a plurality of cables 101, 102, 103 each identical with the cables 1, 1a of FIG. 1. Cables 101, 102, 103 are joined end-to-end by joint accessories 110, 112 each identical with the joint accessory shown in FIG. 1. The ends of the cable system are terminated by respective terminal accessories 120, 122 each as described above.

What is claimed is:

1. A communications cable system comprising:
   a. a plurality of communications cables joined end-to-end, each said communications cable comprising:
      i. a plurality of single-material optical fibres extending the length of the respective cable; and
      ii. a plurality of short lengths of cladded-core optical fibres at each end of the respective cable, said single-material optical fibres being optically joined at their opposite ends to respective ends of respective said short cladded-core optical fibres; and
   b. a plurality of cable joining means, each joining the ends of an adjacent pair of said cables, each said means being provided with a plurality of through-bores extending between the pair of cables joined thereby, the free ends of the short cladded-core optical fibres of the two cables being inserted into opposite ends of respective said through-bores.

2. A cable system as claimed in claim 1, further comprising, at each end of each said cable, a plurality of capillary tubes receiving in their opposite ends respective said single-material optical fibres of the respective cable and respective said cladded-core optical fibres, the single-material optical fibres and the respective cladded-core optical fibres abutting end-to-end within the respective capillary tube.

3. A cable system as claimed in claim 2, in which said single-material optical fibres of each cable are joined at their opposite ends by adhesive to said respective cladded core optical fibres, said adhesive having a refractive index matched to those of the cores of the single-material and cladded-core optical fibres.

4. A cable system as claimed in claim 2, further comprising a seal at the end, of each said capillary tube, which receives a said cladded-core optical fibre, said seal securing said cladded-core optical fibre to the capillary tube and also closing the capillary tube, at that end thereof, to fluids.

5. A cable system as claimed in claim 2 further comprising a seal at the end, of each capillary tube, which receives a said single-material optical fibre, said seal securing said single-material optical fibre to said capillary tube.

6. A cable system as claimed in claim 2, further comprising an end block at each end of each cable, said end block being provided with apertures in which the respective capillary tubes are received and supported.

7. A cable system as claimed in claim 2, in which said capillary tubes are supported with their longitudinal axes parallel to the longitudinal axis of the respective cable.

8. A cable system as claimed in claim 1, further comprising in each cable, a mechanically re-inforcing layer disposed around the optical fibres of that cable.

9. A cable system as claimed in claim 1, in which each said cable joining means comprises a plurality of capillary tubes, each capillary tube comprising a said through bore.

10. A cable system as claimed in claim 1, in which at each cable joining means the projecting optical fibre ends of each cable joined thereat are longer than to reach and abut the cladded-core optical fibre ends of the other cable and the projecting optical fibres follow curved paths between each cable and the cable joining means through-bores whereby to be under axial compressive forces.

11. A cable system as claimed in claim 1, in which each cable joining means includes a chamber through which the projecting optical fibres extend from each cable joined thereat to the through-bores of the cable joining means and a liquid filling said chamber under pressure, having a refractive index matched to that of the core of the solid-core optical fibres.

* * * * *